T. L. TALIAFERRO.
CLOSURE FOR JELLY GLASSES OR THE LIKE.
APPLICATION FILED SEPT. 6, 1919.
1,343,013.　　　　　　　　　　　Patented June 8, 1920.
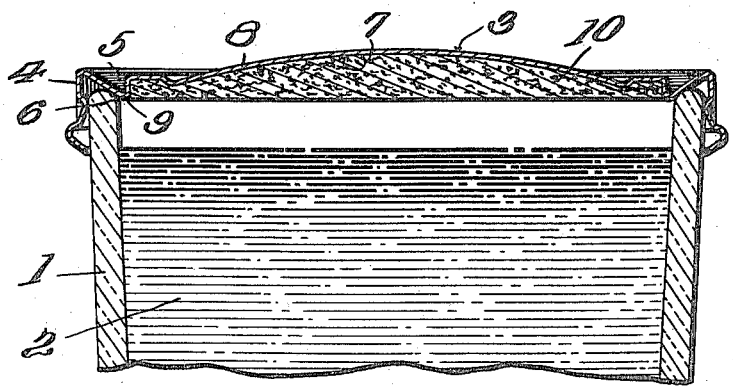
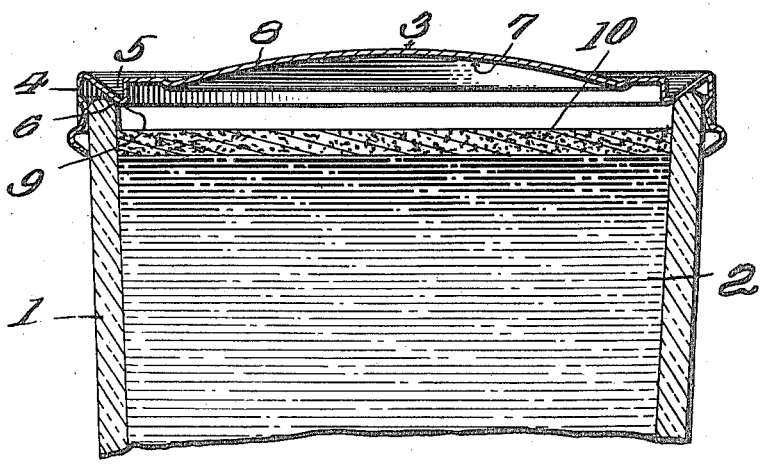

UNITED STATES PATENT OFFICE.

THOMAS LUCIEN TALIAFERRO, OF CHICAGO, ILLINOIS.

CLOSURE FOR JELLY-GLASSES OR THE LIKE.

1,343,013.

Specification of Letters Patent.   Patented June 8, 1920.

Application filed September 6, 1919.   Serial No. 322,044.

*To all whom it may concern:*

Be it known that I, THOMAS LUCIEN TALIAFERRO, a citizen of the United States, residing at Chicago, in the county of Cook, State of Illinois, have invented certain new and useful Improvements in Closures for Jelly-Glasses or the like, of which the following is a description, reference being had to the accompanying drawing and to the figures of reference marked thereon.

The invention relates to new and useful improvements in closures for containers and more particularly to a closure for a jelly glass or the like, wherein the contents is usually sealed by a sealing material flowed directly on to the contents within the container.

An object of the invention is to provide means whereby a predetermined amount of sealing material may be adheringly secured to the closure in such a way that when heat is applied to the sealing material, after the closure has been placed on the body portion of the container, said sealing material will flow down on to the contents within the container and seal the same.

A further object of the invention is to provide a closure of the above character, wherein the sealing material is so applied as to be wholly within the limits of the container, so that the entire amount of sealing material will flow into the container and on to the contents thereof.

These and other objects will in part be obvious and will in part be hereinafter more fully disclosed.

In the drawings which show by way of illustration one embodiment of the invention—

Figure 1 is a sectional view through a container having my improved closure applied thereto;

Fig. 2 is a similar view, but showing the container after heat has melted the sealing material and caused the same to flow on to the contents of the container for sealing the same.

The invention consists broadly in providing a closure for a container, such as a jelly glass, with a recess in its inner face, which recess is directly above the contents of the container when the closure is applied thereto, and then filling said recess with a sealing material, such as paraffin, or the like, which melts at a very low temperature, so that after the closure is applied, the heat of the contents of the container will melt the paraffin and cause the same to flow down on to the surface of the contents of the container. Or said sealing material may, if desired, be melted by applying heat to the outer surface of the container. The essential features of the invention consist in forming a recess in the inner face of the closure into which the sealing material may be molded and caused to become, in a sense, a part of the closure, so that the sealing material may be supplied by the manufacturer and the closures shipped and handled without the sealing material being loosened therefrom. This recess for the sealing material contains a measured or predetermined amount of sealing material and just enough so as to supply a proper seal for the contents of a jelly glass, or the like, to which the closure is applied. Then, again, the recess is so disposed that all of the sealing material will flow into the container and on to the surface of the contents thereof.

Referring more in detail to the drawings, I have shown a container consisting of a glass body portion 1, which is of the usual shape of jelly glasses. The contents or material which is to be stored in the jelly glass is indicated at 2. The body portion of the container is covered by a closure 3 which is preferably formed of metal. This closure has a top portion formed with a depending flange 4, which is adapted to grip the outer wall of the body portion 1 for frictionally holding the closure on the body portion. This frictional grip between the closure and the body portion of the container may be of any desired construction, but is preferably of the construction shown and described in my application Serial No. 263,149, filed November 19, 1918.

The closure is formed with an annular groove 5, which is disposed close to the inner edge 6 of the body portion of the container. Said groove is formed by an inward bending of the metal and this forms a recess 7 in the inner face of the top portion of the closure. The metal part 8 of the closure is dome-shape, which increases slightly the capacity of the recess 7. Within this recess 7 is poured the sealing material, preferably paraffin. The sealing material hardens in the recess and firmly adheres to the metal parts of the closure becoming, in a sense, a unitary structure with the closure, so that the closure may be handled and shipped without any fear of dislocating the sealing material. The recess is filled preferably to the level of the top of the annular rib 9 formed by the groove 5. It is understood, of course, that the closures are bottom side up when filled. Each closure will, therefore, have a predetermined amount of sealing material.

After the closure is applied to the receptacle, as shown in Fig. 2, the heat of the contents of the container will cause the sealing material to melt and flow down on to the surface of the contents of the container. The sealing material is indicated at 10 in both Figs. 1 and 2 of the drawings. Instead of depending upon the heat of the contents of the container, heat may be applied to the outer surface of the closure and thus the sealing material melted and caused to flow down on to the surface of the contents of the same. It will be noted that the diameter of this recess is slightly smaller than the inner diameter of the container at the edge 6, so that all of the paraffin or sealing material will flow into the interior of the container and on to the contents thereof.

It is obvious that minor changes in the details of the construction of the closure and the shape of the parts may be made without departing from the spirit of the invention, the essential feature consisting in the permanent attachment of a predetermined amount of sealing material to the closure in such a manner that the closure may be shipped and handled without disturbing or dislocating the sealing material and also in such a manner that the sealing material will when heated melt and flow down on to the contents of the container.

Having thus described my invention, what I claim as new and desire to secure by Letters Patent, is:

1. A closure for containers comprising a top portion having a depending flange for engagement with the body portion of the container, and a sealing material permanently secured directly to the top portion of the container at the inner face thereof, said top portion being so constructed that said sealing material is directly exposed to the heat of the contents of the container whereby said sealing material when melted will flow down on to the contents of the container and seal the same.

2. A closure for containers comprising a top portion having a depending flange for engagement with the body portion of the container, said top portion having a recess formed in its inner face and a disk of sealing material molded in the said recess and adheringly secured to said closure, said top portion being so constructed that said sealing material is directly exposed to the heat of the contents of the container whereby said sealing material when melted will flow down on to the contents of the container and seal the same.

3. A closure for containers comprising a top portion having a depending flange for engagement with the body portion of said container, said top portion having a recess formed in its inner face, the outer diameter of said recess being smaller than the inner diameter of said container at the extreme upper edge thereof, and a sealing material molded into said recess and adheringly secured to said container, said sealing material when melted flowing down on to the contents of the container and sealing the same.

In testimony whereof I affix my signature.

THOMAS LUCIEN TALIAFERRO.